(12) United States Patent
Bollschweiler

(10) Patent No.: US 8,834,013 B2
(45) Date of Patent: Sep. 16, 2014

(54) DOSING DEVICE

(75) Inventor: Hans Reinhold Bollschweiler, Monaco (MC)

(73) Assignee: Woywod Kunststoffmachinen GmbH & Co. KG, Grafelfing bei Munchen (DE)

( * ) Notice: Subject to any disclaimer, the term of this patent is extended or adjusted under 35 U.S.C. 154(b) by 546 days.

(21) Appl. No.: 13/127,526

(22) PCT Filed: Sep. 16, 2009

(86) PCT No.: PCT/EP2009/006684
§ 371 (c)(1),
(2), (4) Date: May 4, 2011

(87) PCT Pub. No.: WO2010/051879
PCT Pub. Date: May 14, 2010

(65) Prior Publication Data
US 2011/0223276 A1    Sep. 15, 2011

(30) Foreign Application Priority Data
Nov. 4, 2008 (DE) .......................... 10 2008 055 756

(51) Int. Cl.
*B01F 15/02* (2006.01)
*B29C 47/10* (2006.01)
*B29C 47/00* (2006.01)

(52) U.S. Cl.
CPC ............. *B29C 47/10* (2013.01); *B29C 47/1027* (2013.01); *B29C 47/0009* (2013.01); *B29C 47/1009* (2013.01)
USPC ....... 366/156.1; 366/76.1; 222/333; 222/412; 222/413; 198/658; 198/671

(58) Field of Classification Search
USPC ........ 141/256; 222/333, 412, 413; 366/156.1, 366/156.2, 76.1, 76.3; 425/587, 585, 580, 425/582
See application file for complete search history.

(56) References Cited

U.S. PATENT DOCUMENTS

| 3,355,766 | A | 12/1967 | Causemann et al. |
| 5,681,132 | A * | 10/1997 | Sheppard, Jr. .................. 406/61 |
| 6,267,495 | B1 * | 7/2001 | Hurst ......................... 366/76.91 |

FOREIGN PATENT DOCUMENTS

| DE | 196 29 824 A1 | 1/1998 |
| EP | 1 544 138 A1 | 6/2005 |
| GB | 666686 | 2/1952 |
| GB | 1055251 | 1/1967 |
| GB | 2 182 628 A | 5/1987 |

OTHER PUBLICATIONS

EP Translation of the International Preliminary Report dated May 19, 2011 in English.

* cited by examiner

*Primary Examiner* — Amjad Abraham
*Assistant Examiner* — Ninh Le
(74) *Attorney, Agent, or Firm* — Antonelli, Terry, Stout & Kraus, LLP.

(57) ABSTRACT

The invention relates to a metering device for supplying devices such as, for example, extruders, injection molding machines or the like with bulk materials such as pellets, chips, granules, powders, flakes, grains, flour or the like, having a housing. It is demonstrated how an optimally smooth passage of such bulk materials through such a metering device is possible without there being any possibility of nests forming and throughflow being hindered in the feed channel.

12 Claims, 8 Drawing Sheets

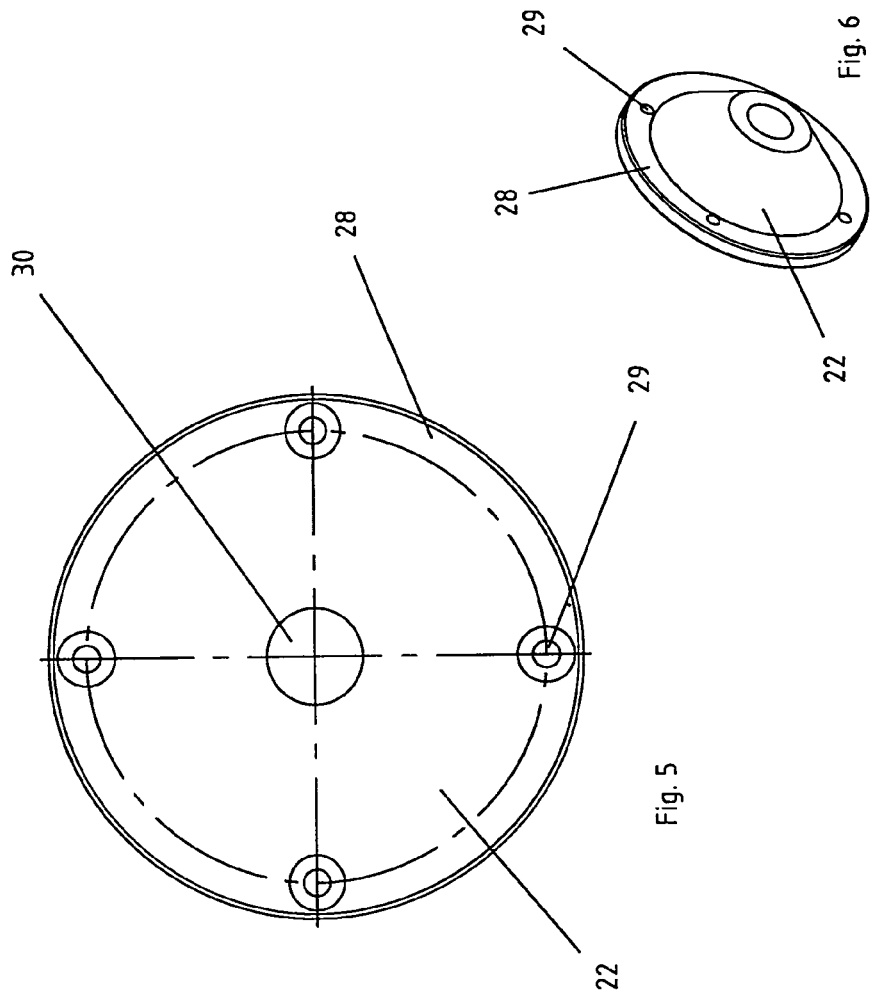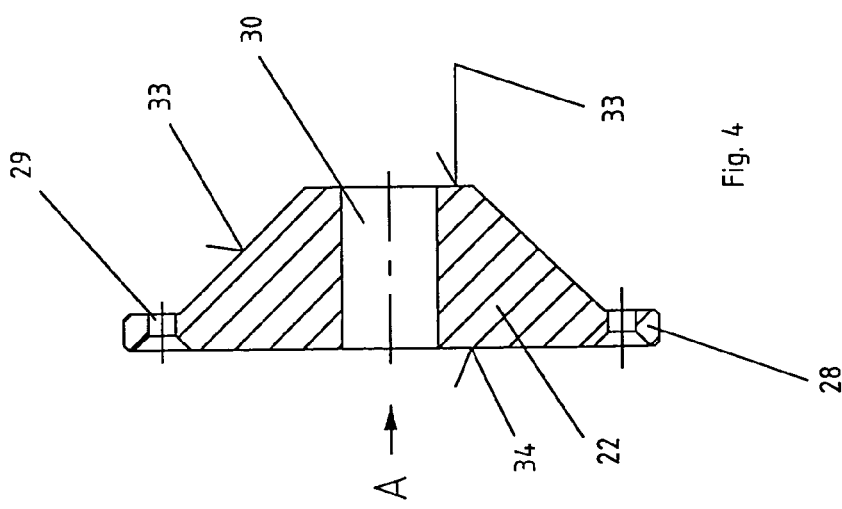

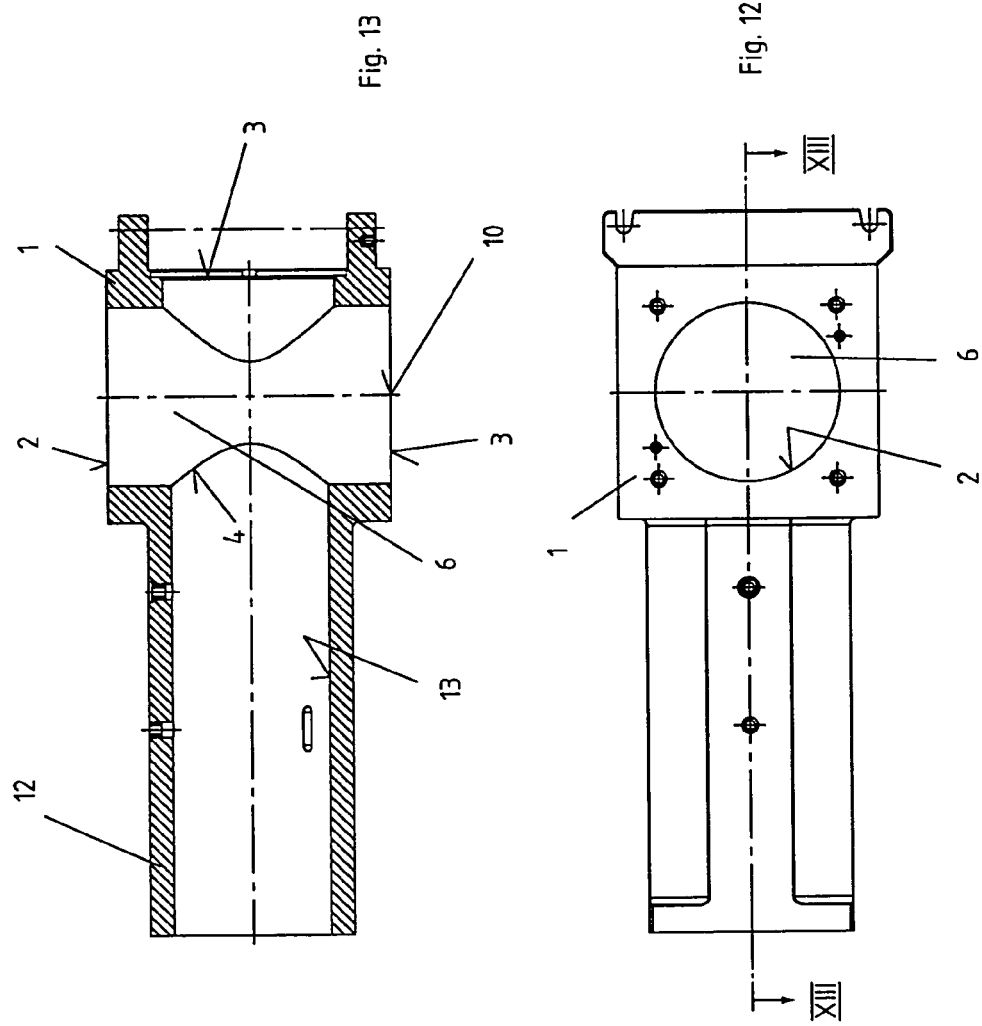

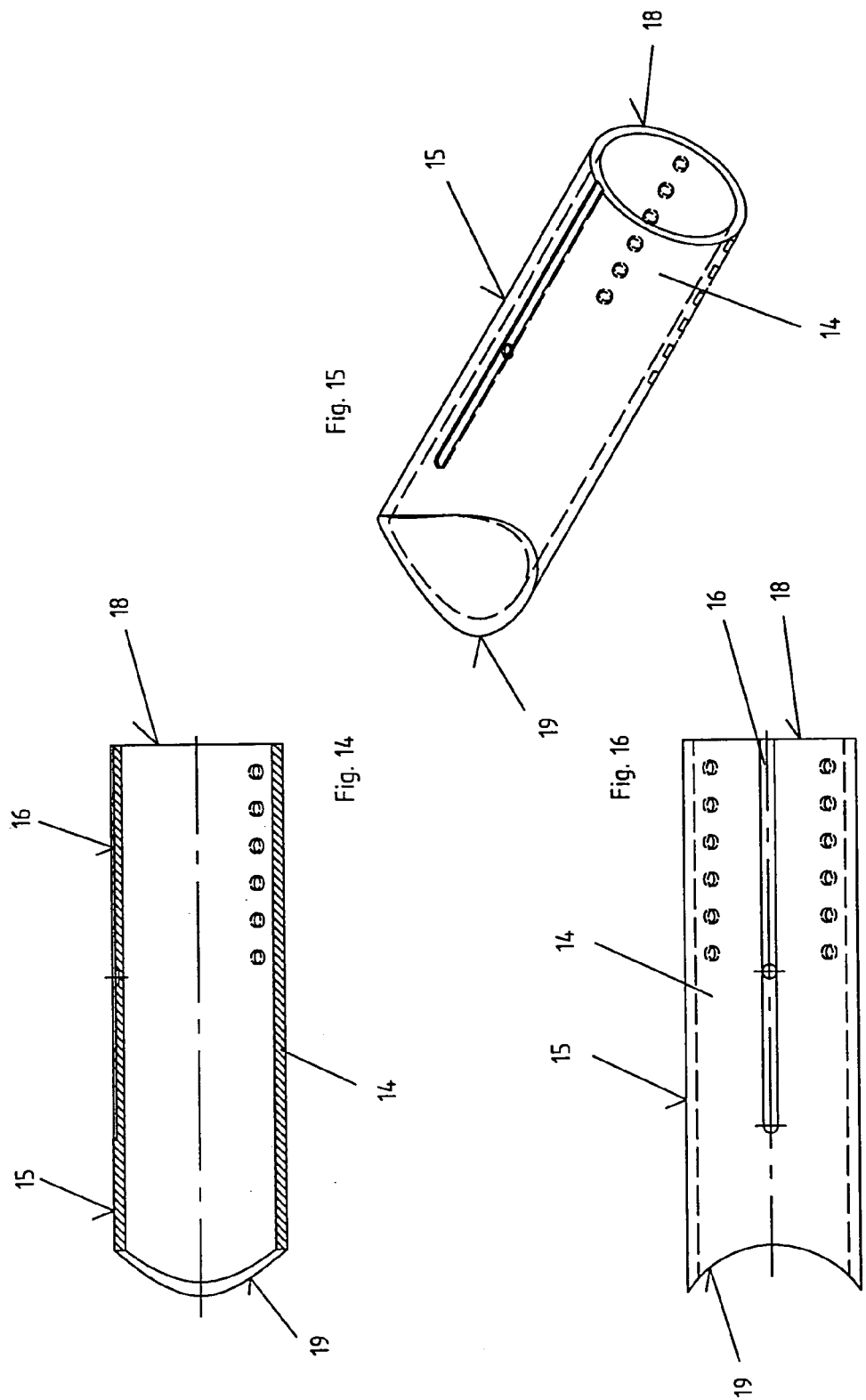

DOSING DEVICE

FIELD OF THE INVENTION

The invention relates to a metering device for supplying devices such as extruders, injection molding machines or the like with bulk materials such as pellets, chips, granules, powders, flakes, grains, flour or the like.

PRIOR ART

Metering devices of this type belong to the prior art. They are used, for example, for supplying mixers, mills and the like with granules such as plastic granules, for example also in order to mix colour components. The feeding is generally effected via a hopper or feed hose which is connected via a flange to a housing which has a square or approximately square design at the connection point. This consequently results in dead zones in which nests can form which obstruct the flow of material, and hence the passage of the material to be conveyed. The bearing for the conveyor screw, which projects into the vertical feed channel, also hinders the passage of the bulk material as bulk material can come to rest on or adhere to it so that, as a result, emptying of the feed channel and hence unhindered passage of the bulk material are also obstructed.

A conveying device for powdery or granular solids having a single- or multiple-shaft conveyor screw and a charging chute is already known from DE 196 29 824 A1, wherein a moistening device surrounding the screw or screws and which serves to inject a liquid into the screw space is arranged between the housing of the single- or multiple-shaft conveyor screw and the charging chute, said moistening device consisting of a housing ring with at least one liquid feed line and an annular nozzle insert which can be pushed into the housing ring, an annular space connected to the liquid feed line being left between the housing ring and the nozzle insert. The nozzle insert is provided with nozzle boreholes which connect the annular space to the screw space. The inner contour of the nozzle insert is circular, the boreholes being arranged uniformly distributed around the circumference along the inner contour. The inner contour of the nozzle insert is shaped like a pair of spectacles and matches the screw space. The nozzle boreholes at the nozzle insert are thus designed to be essentially axially parallel, an annular oblique guiding surface being arranged on the housing ring such that the jets of liquid emerging from the nozzle boreholes strike the guiding surfaces and are deflected by them into the screw space. The guiding surfaces are attached at an angle of 30° to 45° to the axis. The intention is that the moistening process is simplified as a result, it being possible for the product to be moistened in a reproducible and uniform manner. Moreover, the moistening could be carried out continuously with only a small amount of dust being formed.

A device for the controlled feeding of granules is already known from GB 2 182 628 A. For this purpose, a tubular housing has a feed pipe arranged orthogonally with respect to its longitudinal axis and on which a hopper is arranged. A motor drives a conveyor screw which is arranged in the tubular pipe and which discharges into an outlet pipe arranged on the opposite side of the feed pipe and also with its longitudinal axis orthogonal to the longitudinal axis of the conveyor screw.

GB 666,686 A describes a device for transporting burnable material, for example coke or coal, in a tubular housing with a screw-like motor-driven element to which the material to be conveyed is fed from above via a conveying hopper.

OBJECT OF THE INVENTION

The object of the invention is to configure a metering device of the required type such that it allows high conveying performance for all relevant bulk materials, both for light material to be ground and poor-flowing materials to be ground.

SOLUTION

The object is achieved by the features listed in Patent Claim 1 or Patent Claim 2.

SOME ADVANTAGES

A metering device according to the invention has a circular, cylindrical feed channel which extends vertically and has no edges or joins that could hinder the flow. The feed hopper or feed hose is constructed in such a way that, at the end facing the feed channel, it has the same radius as the feed channel does at the connecting opening in the housing so that it seamlessly connects coaxially and precisely with the periphery of the feed channel. Only the back pressure bearing for the conveyor screw, which is designed as a frustoconical sealing body, can project somewhat horizontally into the feed channel. As a result of the design according to the invention of the back pressure bearing designed as a conical sealing body, no material can come to rest here. Because the vertical feed channel is also continued below the conveyor screw in the form of a cylinder with the same diameter as far as an emptying shutter, the feed channel can be emptied cleanly and quickly in a simple fashion.

A metering device according to the invention can be used for supplying, for example, extruders, injection molding machines, mixers, mills, for example also in mixing plants, with large quantities of granules and/or very light material to be ground, or serve as a supply unit for starve feeding or for operation with a full hopper.

It is particularly advantageous that the metering device according to the invention is suited not only for high capacities of, for example, 4000 to 8000 kg/h, and preferably 6600 kg/h, but especially also for metering very light material to be ground. Because of the large entrance and the corresponding hopper outlet, poor-flowing material to be ground can also be processed.

As rapid emptying is also possible as a result of the special design of the vertical feed channel, a metering device can correspondingly also be cleaned quickly. This enables a rapid change of materials. The motor can easily be folded away using quick-release fasteners in order to replace the screw.

OTHER EMBODIMENTS OF THE INVENTION

Other embodiments of the invention are described in Patent Claims 3 to 12, which also represent independent solutions of the object of the invention. In the embodiment according to Patent Claim 3, a sealing effect which is leaktight with respect to bulk materials is provided by the sealing body itself in conjunction with these associated seals.

Patent Claim 4 permits a reliable cantilevered mounting of the conveyor screw.

Patent Claim 5 describes an advantageous embodiment.

If a metering device is configured according to Patent Claim 6, the drive motor can be easily pivoted to one side with the coupling part after a quick-release fastener has been released, and thus can be moved out of the coupling position and, by pivoting in the opposite direction and applying the quick-release fasteners, can be returned to the coupling position. Maintenance and cleaning work can thus be carried out quickly and easily.

In the metering device according to Patent Claim 7, the quick-release fasteners are designed as toggle joints which permit reliable and rapid operation.

By using reducing tubes of different diameters, conveyor screws can be used with different configurations and hence different characteristics and conveying properties depending on the bulk material to be conveyed. The longitudinal slot, together with the locking screw, consequently allows non-rotatable locking in the connecting branch of the housing— Patent Claim 8.

Particularly advantageous is an embodiment according to Patent Claim 9 in which the end of the reducing tube which faces the feed channel is configured according to the penetration curve so that no nests of bulk material can form here and the throughflow can take place with little friction.

The metering device according to Patent Claim 10 has, on the underside of the housing, a shutter valve which is arranged in guides and which permits rapid emptying and hence cleaning of the metering device.

And in the embodiment according to Patent Claim 11, a smooth passage results for the fed-in bulk material because the counterpressure body designed as a back pressure bearing is arranged, when viewed in the axial projection of the feed channel, outside or approximately outside the boundary of this feed channel.

Patent Claim 12 describes a further advantageous embodiment of the invention.

The invention is illustrated partially diagrammatically— by way of example in the drawings, in which:

FIG. 4 shows a frustoconical inner part of a two-piece sealing body in an axial longitudinal section;

FIG. 5 shows a view in the direction of the arrow A in FIG. 4;

FIG. 6 shows the frustoconical inner part of the sealing body which can be seen in FIGS. 4 and 5, in a perspective view;

FIG. 12 shows a top view of a housing with a connecting branch which is integral in terms of material for a conveyor screw;

FIG. 13 shows an axial section along the line XIII-XIII in FIG. 12;

FIG. 14 shows a reducing tube in longitudinal section;

FIG. 15 shows a perspective view of the reducing tube which can be seen in FIG. 14;

FIG. 16 shows a top view of the reducing tube which can be seen in FIG. 14.

Figure 1:
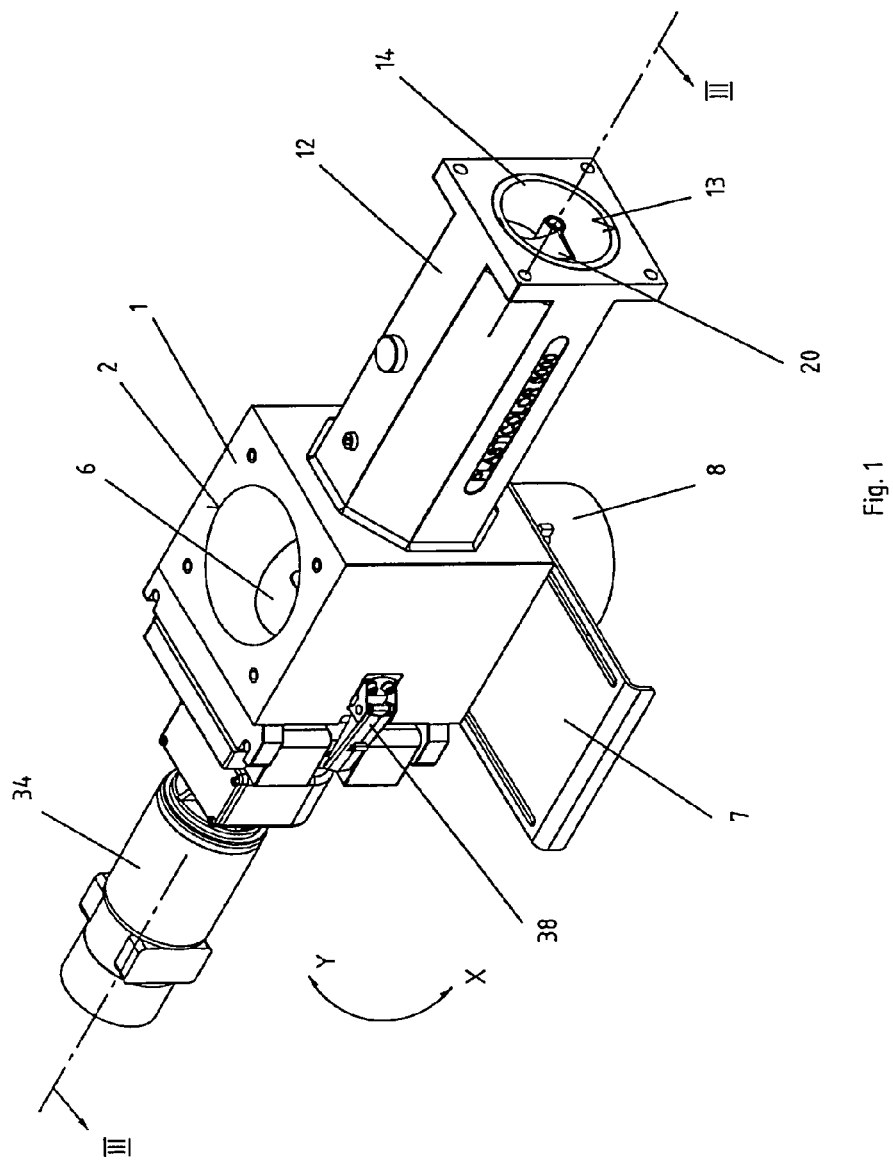
FIG. 1 shows a metering device according to the invention in a perspective view, without the feed hopper.

A housing is designated with the reference numeral 1 which has circular connecting openings 2, 3 and 4, 5, respectively, on each pair of opposite sides. The center points of the connecting openings 2, 3, on the one hand, and 4, 5, on the other hand, are each arranged coaxially with each other. The radii of the connecting openings 2, 3 and 4, 5 are of identical size in the embodiment shown. Furthermore, the connecting openings 2, 3, on the one hand, and 4, 5, on the other hand, open into channels or channel sections with a diameter which is the same size as the associated connecting openings 2, 3 and 4, 5, respectively, which means that the connecting openings open in the form of a cylinder into the corresponding channels or channel sections seamlessly and thus with smooth walls. A hopper or the like (not shown) for feeding in bulk materials is arranged at the connecting openings 2, its mouth is oriented coaxially with the connecting opening 2 and its outlet opening has the same diameter as the connecting opening 2, so that a seamless join results between the feed hopper or the other feed apparatus provided here, for example a feed hose, and the connecting opening 2 and the vertical feed channel 6 connected thereto. In the embodiment shown, on the underside of this feed channel 6, a shutter valve 7 (FIG. 1) arranged so as to be displaceable in guides orthogonally to the longitudinal axis of the feed channel 6 is arranged so as to be longitudinally displaceable in sliding guides, said shutter valve 7 closing the lower connecting opening 3 so as to be leaktight with respect to bulk materials but also being able to free the connecting opening leading to an outlet branch 8 (FIGS. 1, 2 and 3), so that material can be removed quickly from the housing 1, in particular from the feed channel 6, in order to be able to, for example, change the material.

A safety grating is designated with the reference numeral 9 with a mesh width dimensioned such that it is not possible to reach inside the outlet branch 8 and hence inside the feed channel 6.

The longitudinal axis 10 of the feed channel 6, on the one hand, which runs through the center points of the connecting openings 2 and 3, and the longitudinal axis 11 which runs through the center points of the connecting openings 4, 5, on the other hand, intersect orthogonally preferably in the center of the feed channel 6 inside the housing 1.

The connecting opening 5 of the housing 1 is connected to a connecting branch 12 which is materially integral in the embodiment shown, but can also be flange-mounted with a flange (not shown) and sealed so as to be leaktight with respect to bulk materials. In the embodiment shown (FIG. 1), this connecting branch 12 has a polygonal outer form but internally has a continuous cylindrical channel 13 in which a reducing tube 14 is arranged. The reducing tube 14 can be made from a suitable plastic, for example from polyamide, which has a cylindrical design on its outside (FIGS. 14 to 16).

The outer jacket surface 15 of the reducing tube 14 lies flush against the cylindrical inner wall of the channel 13 of the connecting branch 12. The reducing tube 14 has, at the top as seen in the drawings, a longitudinal groove 16 into which a locking screw 17 with a longitudinal axis orthogonal to the longitudinal axis of the connecting branch 12 can be screwed from outside, in order to guide the reducing tube 14 in the provided position and lock it too.

Figure 2:
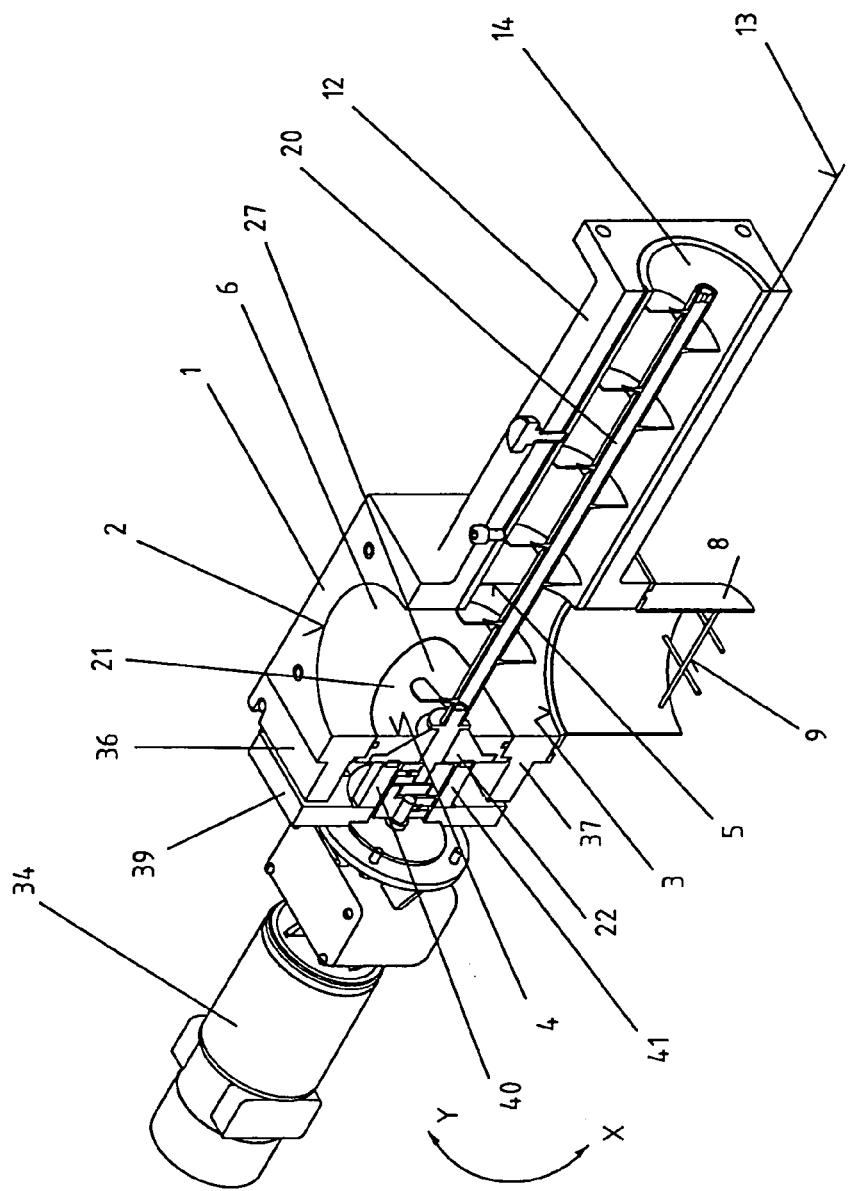
FIG. 2 shows the metering device which can be seen in FIG. 1, also illustrated in perspective and partially cutaway, without the lower shutter valve.
Figure 3:
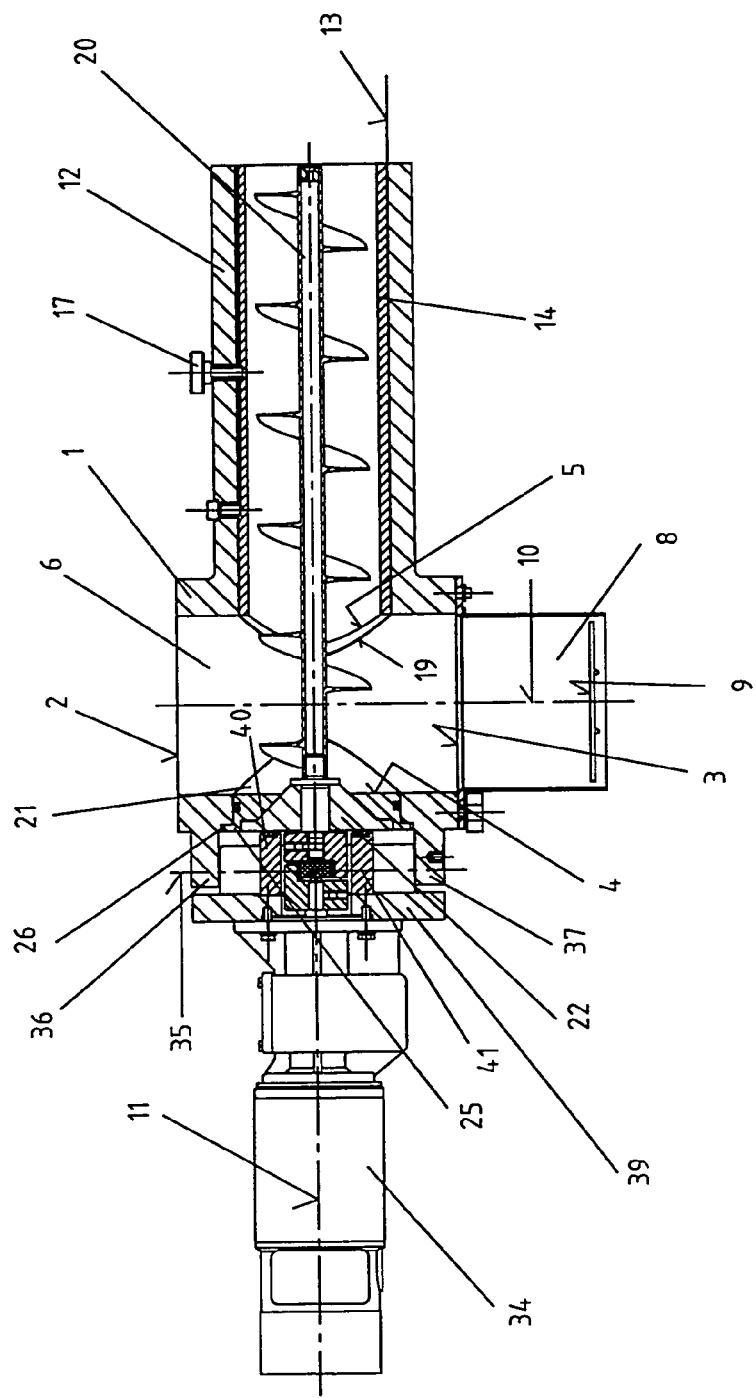
FIG. 3 shows a partial axial longitudinal section along the line III-III in FIG. 1.
Figure 9:
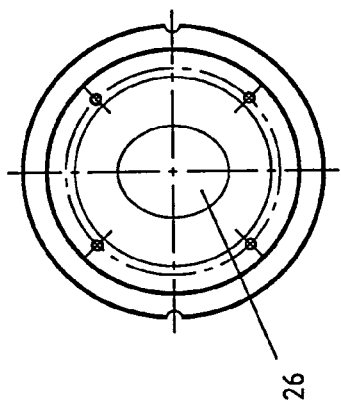
FIG. 9 shows a view in the direction of the arrow C in FIG. 7.

On its outward facing end side 18, the reducing tube 14 is provided with a wall that extends orthogonally with respect to the longitudinal axis of the connecting branch 12 and fits flush with that end side of the connecting branch 12 provided here (FIGS. 1 to 3).

In contrast, at its opposite end the reducing tube 14 has a shaping 19 which corresponds to the penetration curve of the reducing tube 14 and of the connecting branch 12 into the feed channel 6 in such a way that the shaping 19 and the channel 13 fit seamlessly with the walls of the feed channel 6 so that no material nests can form here and the transport of material is not hindered. The wall of the feed channel 6 is virtually smooth at the penetration curve so that the flow of material is unhindered.

The reducing tube 14 is passed through coaxially by a conveyor screw 20 which is mounted in cantilevered fashion in a sealing body, consisting of an outer part 21 and an inner part 22, in the region of the opening 4. The frustoconical sealing body, which is in two pieces but functions as a single piece and is formed from the outer part 21 in the form of an outer ring and the frustoconical inner part 22, is mounted in the connecting opening 4.

The outer part 21 has an annular part 23 with one or two axially spaced-apart grooves 24 for receiving one seal each, a flange-like part 25 being arranged in force-fitted fashion in a corresponding annular recess of that end side of the housing 1 provided here, and can also be sealed here. The outside of the annular part 25 can fit flush with that outer side of the housing 1 provided here.

The outer part 21 has a frustoconical recess 26 for receiving the frustoconical inner part 22 in a force-fitting fashion. The flange-like part 25 can be provided at its circumference with a plurality of through openings for the passage of threaded bolts (not shown), by means of which the outer part 21 can be connected to the inner part 22 so as to function as one piece but detachably.

Figure 11:
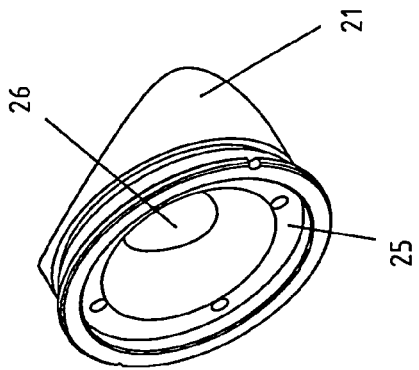
FIG. 11 shows the outer part of the sealing body, designed as an outer ring, which can be seen in FIG. 10, in the direction of viewing of the arrow D in FIG. 10.
Figure 10:
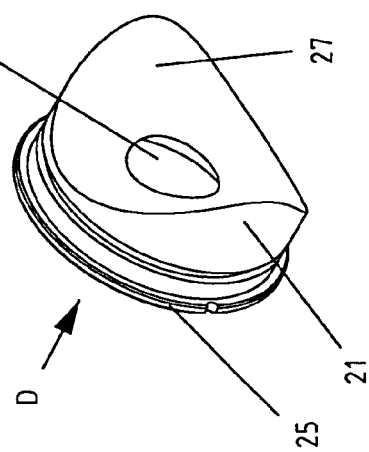
FIG. 10 shows the outer part of the sealing body, which can be seen in FIGS. 7 to 9, in a perspective view, seen from the inside.
Figure 7:
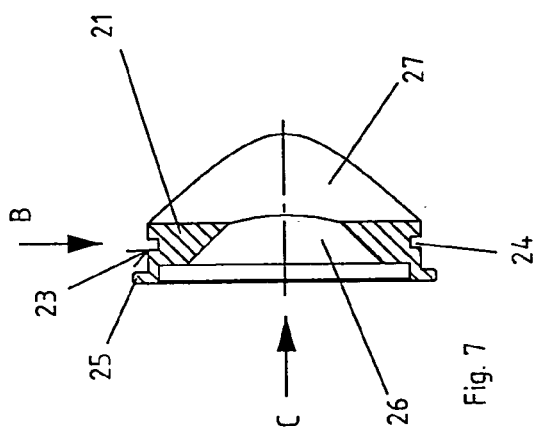
FIG. 7 shows an outer part of the sealing body, designed as an outer ring, also in an axial longitudinal section.
Figure 8:
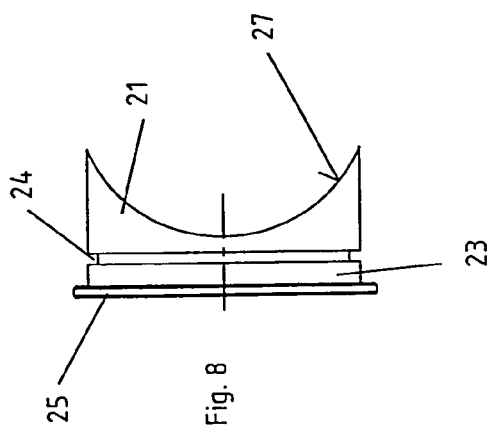
FIG. 8 shows a view in the direction of the arrow B in FIG. 7.

As can be seen in particular in FIGS. 7, 10 and 11, the outer part 21 designed as an outer ring has, at its longitudinal section projecting through the connecting opening 4 into the feed channel 6, a shape 27 which corresponds to the penetration curve into the connecting channel provided here in such a way that the shape 27 of the outer part 21 opens into the feed channel 6 with smooth walls and accordingly seamlessly and fits seamlessly and with smooth walls with the cylindrical wall of the feed channel, and consequently in no way hinders the throughflow of the material.

The inner part 22 is arranged in force-fitting fashion in the frustoconical recess 26 of the outer part 21 and forms a counterpressure bearing, designed as a back pressure bearing, for the cantilevered mounting of the conveyor screw 20. When viewed from above in the direction of the longitudinal axis 10 (in the plane of the drawing in FIGS. 1 to 3), the conical inner part 22 does not project, or hardly projects, into the clear cross section of the feed channel 6 so that neither does the inner part 22 hinder the throughflow of material through the feed channel 6. No material can be deposited and no nests can form on or at the inner part 22.

The inner part 22 also has a flange 28 with through bores 29 which are distributed over its circumference and only one of which is designated for simplicity's sake. The different through bores 29 can be arranged over the circumference of the flange 28 at uniform angular spacings. Fastening screws, which connect the inner part 22 to the outer part 21 so that they function as one piece but detachably to form a single sealing body, engage through the through bores.

Figure 17:
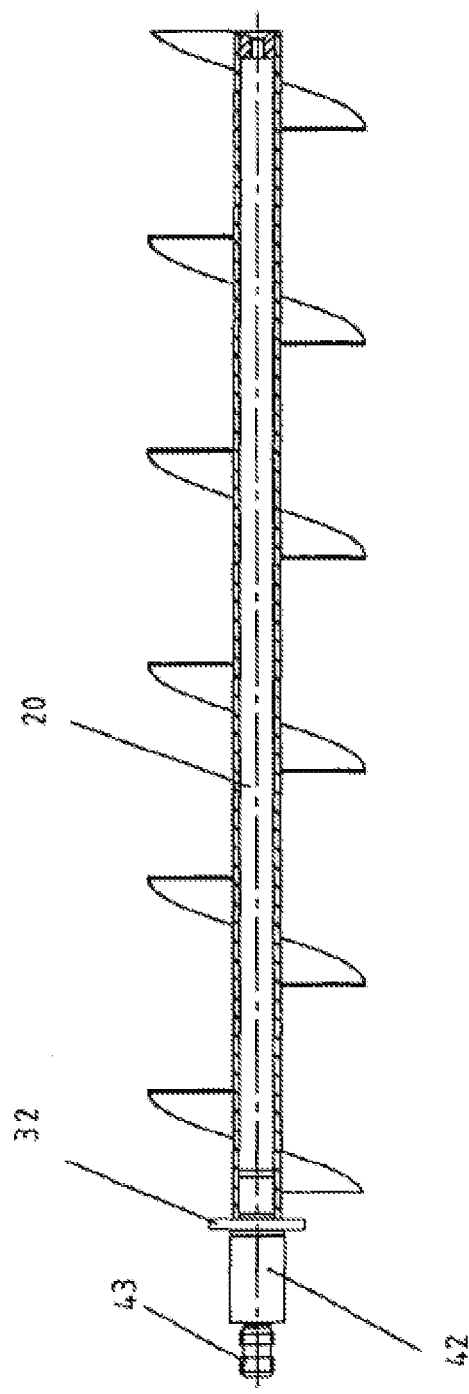
FIG. 17 shows a conveyor screw, partially in an axial longitudinal section and partially in projection.

The essentially frustoconical inner part 22 has a central through bore 30 in which a cylindrical longitudinal section 42 (FIG. 17) of the conveyor screw 20 having a coupling part 43, which can be brought into or out of engagement in a force-fitting fashion with a driving part of the drive motor 34, is arranged, which conveyor screw 20 bears in leaktight fashion with a collar 32 against the end side 33a of the inner part 22 and consequently transmits the axial thrust to the inner part 22. A mounting for the conveyor screw 20 is consequently also provided which is leaktight with respect to bulk material.

As can be seen, the special shape 19 of the end section of the reducing tube 14 and the shape 27 of the outer part 21 and the shape of the inner part 22 at its cone 33 produce an unhindered throughflow for the material as the circular feed channel 6 has the same diameter as the connecting opening 2 and no obstructive edges and joins result. Rather, the reducing cylinder or the like which is connected to the connecting opening 2 is constructed such that, at the end facing the feed channel 6 and its connecting opening 2, it has the same radius as the feed channel 6. It therefore fits precisely with the curvature and thus the diameter of the feed channel 6. Only the frustoconical back pressure bearing for the conveyor screw 20 formed by the inner part 22 does not project horizontally into this feed channel 6, or projects only by a small axial longitudinal section with its cone 33 and the counterpressure bearing for the conveyor screw 20. As a result of the frustoconical design of the counterpressure bearing, no material comes to rest on this back pressure bearing when the feed channel 6 is emptied. As a result of the cylindrical continuation of the circular feed channel 6 with the same diameter beneath the conveyor screw 20 as far as the shutter valve 7, the feed channel 6 can be emptied cleanly and quickly in a simple manner.

A drive motor unit for the conveyor screw 20 is designated by 34 which is associated with a controllable or regulatable electromotor. The controlling or regulating means, for example a programmable logic controller, are not shown. Precise adjustment of the rotational speed of the conveyor screw 20 can consequently be obtained with high speed stability and a linear regulating behavior. Reliable reproducibility of the settings is provided by the use of suitable controlling and regulating means.

The drive motor unit 34 can be pivoted in the direction X or Y, about a vertical axis of pivoting 35 which is arranged in spaced-apart bearings 36 and 37 and quickly locked on the housing 1 but also released again by bayonet fasteners 38. The drive motor unit 34 has a plate 39 with which spaced-apart pressure-exerting pieces 40 and 41 are associated. The pressure-exerting pieces 40 and 41 act counter to the inner part 22 of the two-part sealing body 21, 22 and lock the latter in the connecting opening 4. Pivoting the drive motor unit 34 to one side not only allows rapid access to and replacement of the drive motor unit 34 but it also makes it possible to replace the sealing body consisting of the inner part 22 and the outer part 21 easily and unproblematically, optionally together with the conveyor screw 20, so that the metering device can also be conveniently and quickly fitted out for different materials by substituting different conveyor screws 20 and/or the reducing tube 14.

The features which are described in the abstract, the patent claims and the description and can be seen in the drawings can be essential for the implementation of the invention, both individually and in any combinations.

REFERENCE NUMERALS

1 Housing
2 Connecting opening
3 "
4 "
5 "

6 Feed channel
7 Shutter valve
8 Outlet branch
9 Safety grating
10 Longitudinal axis
11 "
12 Connecting branch
13 Channel
14 Reducing tube
15 Jacket surface
16 Longitudinal groove
17 Locking screw
18 End side
19 Shaping
20 Conveyor screw
21 Outer part
    Sealing body
22 Inner part
23 Annular part
24 Groove
25 Flange-like part
26 Frustoconical recess
27 Shape
28 Flange
29 Through bore
30 "
31 Longitudinal section
32 Collar
33 Cone, counterpressure bearing
33a End side
34 Motor, drive motor unit, motor arrangement
35 Axis of pivoting
36 Bearing
37 "
38 Bayonet fastener, quick-release fastener
39 Plate
40 Pressure-exerting piece
41 "
42 Longitudinal section
43 Coupling part
A Direction of viewing
B "
C "
D "
X Direction of pivoting of the drive motor unit 34
Y "

The invention claimed is:

1. Metering device for supplying devices with bulk materials comprising:
    a housing which has a first pair of opposite sides and a second pair of opposite sides;
    a first pair of circular connecting openings on the first pair of opposite sides, the center points of the circular connecting openings of the first pair of circular connecting openings arranged coaxially with each other, and the diameters of the circular connecting openings of the first pair of circular connecting openings being the same;
    a second pair of circular connecting openings on the second pair of opposites sides, the center points of the circular connecting openings of the second pair of circular connecting openings arranged coaxially with each other, and the diameters of the circular connecting openings of the second pair of circular connecting openings being the same;
    a cylindrical vertical feed channel connecting the circular connecting openings of the first pair of circular connecting openings into which each circular connecting opening of the first pair of circular connecting openings seamlessly open, the feed channel having an inner wall, the feed channel having a diameter the same as the diameter of the circular connecting openings of the first pair of circular connecting openings, and the feed channel having a longitudinal axis arranged coaxially with the center points of the first pair of circular connecting openings, wherein the bulk material can be fed from above seamlessly into the feed channel via a hopper having an outlet opening with the same diameter of first pair of circular connecting openings;
    a cylindrical lateral channel connecting the circular connecting openings of the second pair of circular connecting openings, and orthogonally penetrating the feed channel, into which each circular connecting opening of the second pair of circular connecting openings seamlessly open, the lateral channel having an inner wall, the lateral channel having a diameter the same as the diameter of the circular connecting openings of the second pair of circular connecting openings, and the lateral channel having a longitudinal axis arranged coaxially with the center points of the second pair of circular connecting openings, wherein the penetration of the lateral channel into the feed channel produces a penetration curve corresponding to the intersection of the inner wall of the lateral channel and the inner wall of the feed channel; and
    a drive motor unit arranged laterally on the housing via a conveyor screw which is arranged in cantilevered fashion on a sealing body, the sealing body having an outer part having a shape corresponding to the penetration curve and fitting seamlessly with the inner wall of the vertical feed channel in accordance with the penetration curve, and which absorbs axial and radial stresses of the conveyor screw with a frustoconical part arranged in the housing in the axial direction of the conveyor screw.

2. Metering device according to claim 1, characterized in that the conveyor screw is arranged in a replaceable reducing tube which has a longitudinal groove into which a locking screw screwed in from outside engages.

3. Metering device according to claim 2, characterized in that the reducing tube is shaped at its end facing the feed channel in such a way that this form forms a seamless surface with the penetration curve of the feed channel.

4. Metering device according to claim 1, further comprising guides on the underside of the housing, and a shutter valve arranged in the guides configured to close a lower connecting opening of the first pair of circular connecting openings.

5. Metering device for supplying devices, with bulk materials comprising:
    a housing which has a first pair of opposite sides and a second pair of opposite sides;
    a first pair of circular connecting openings on the first pair of opposite sides, the center points of the circular connecting openings of the first pair of circular connecting openings arranged coaxially with each other, and the diameters of the circular connecting openings of the first pair of circular connecting openings being the same;
    a second pair of circular connecting openings on the second pair of opposites sides, the center points the center points of the circular connecting openings of the second pair of circular connecting openings arranged coaxially with each other, and the diameters of the circular connecting openings of the second pair of circular connecting openings being the same;
    a cylindrical vertical feed channel connecting the circular connecting openings of the first pair of circular connecting openings into which each circular connecting opening of the first of circular connecting openings seamlessly open, the feed channel having an inner wall, the feed have a diameter the same as the diameter of the circular connecting openings of the first pair of circular connecting openings, and the feed channel having a longitudinal axis arranged coaxially with the center points of the first pair of circular connecting openings, wherein the bulk material can be fed from above seamlessly into the feed channel via a hopper having an outlet opening with the same diameter of the first pair of circular connecting openings, a cylindrical lateral channel connecting the circular connecting openings of the second pair of circular connecting openings, and orthogonally penetrating the feed channel, into which each circular connecting openings of the second pair of circular connecting openings seamlessly open, the lateral channel having an inner wall, the lateral channel having a diameter the same as the diameter of the circular connecting openings of the second pair of circular connecting openings, and the lateral channel having a longitudinal axis arranged coaxially with the center points of the second pair of circular connecting openings, wherein the penetration of the lateral channel into the feed channel produces a penetration curve corresponding to the intersection of the inner wall of the lateral channel and the inner wall of the feed channel;

a frustoconical sealing body comprising:
an outer part having a frustoconical recess and a shape corresponding to the penetration curve;
a frustoconical inner part having an outer annular flange; and
fastening means connecting integrally the frustoconical inner part to the outer part via the outer annular flange of the frustoconical inner part,
wherein the frustoconical inner part is arranged in a force-fitting fashion in the frustoconical recess of the outer part, and
wherein the outer part fits seamlessly with the inner wall of the vertical feed channel in accordance with the penetration curve; and a drive motor unit arranged laterally on the housing via a conveyor screw which is arranged in cantilevered fashion on the frustoconical sealing body, wherein the inner part of the frustoconical sealing body absorbs axial and radial stresses of the conveyor screw, and is arranged in the housing in the axial direction of the conveyor screw, and wherein the frustoconical inner part forms a radial and axial bearing, designed as a counterpressure bearing, for the conveyor screw.

6. Metering device according to claim 5, characterized in that the outer part of the frustoconical sealing body has at least one seal provided in an annular groove which seals off the outer part of the housing so as to be leaktight with respect to a bulk material.

7. Metering device according to claim 5, characterized in that the outer part and the inner part each have a through opening traversing it axially, and in that the through opening of the inner part and the outer part are arranged coaxially with each other and are traversed by a longitudinal section for the conveyor screw.

8. Metering device according to claim 5, characterized in that that longitudinal section of the conveyor screw which penetrates the inner part is provided with a coupling part which can be brought into or out of engagement in a force-fitting fashion with a driving part of the drive motor by being pivoted.

9. Metering device according to claim 8, characterized in that the drive motor unit with the coupling part is arranged pivotably about an axis of pivoting arranged on the housing and can be locked in the coupling position by a quick-release fastener.

10. Metering device according to claim 9, characterized in that the quick-release fastener is formed by a toggle joint.

11. Metering device according to claim 9, characterized in that the drive motor unit is integrally associated with at least two diametrically opposite bodies designed as pressure-exerting pieces which act counter to the inner part of the sealing body and lock the latter in one of the circular connecting openings of the second pair of the housing.

12. Metering device according to claim 5, characterized in that the counterpressure bearing is arranged in a direction of an axial projection of the feed channel outside the boundary of this feed channel or is arranged in the feed channel with just a small axial longitudinal section.

\* \* \* \* \*